(12) United States Patent
Lönnfors et al.

(10) Patent No.: US 9,220,062 B2
(45) Date of Patent: Dec. 22, 2015

(54) METHOD AND APPARATUS FOR LOW-POWER BROWSING

(75) Inventors: Mikko Aleksi Lönnfors, Helsinki (FI); Petri Martti Vuori, Salo (FI); Jani Edvin Penttilä, Lempäälä (FI); Juha Harri-Pekka Nurmi, Salo (FI); Ilkka Antero Oksanen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 551 days.

(21) Appl. No.: 13/075,484

(22) Filed: Mar. 30, 2011

(65) Prior Publication Data

US 2012/0250598 A1 Oct. 4, 2012

(51) Int. Cl.
*H04W 52/02* (2009.01)
*H04W 4/18* (2009.01)
*H04L 29/08* (2006.01)

(52) U.S. Cl.
CPC ........... *H04W 52/0209* (2013.01); *H04L 67/04* (2013.01); *H04L 67/2823* (2013.01); *H04W 4/18* (2013.01); *H04L 67/02* (2013.01)

(58) Field of Classification Search
USPC ................................. 370/311, 322
See application file for complete search history.

(56) References Cited

U.S. PATENT DOCUMENTS

| 5,727,159 | A | 3/1998 | Kikinis |
| 6,785,255 | B2 | 8/2004 | Sastri et al. |
| 7,574,486 | B1 | 8/2009 | Cheng et al. |
| 7,739,392 | B2 | 6/2010 | Wu |
| 2003/0200481 | A1* | 10/2003 | Stanley ........................... 714/14 |
| 2008/0070603 | A1 | 3/2008 | Mao |
| 2010/0048253 | A1* | 2/2010 | Park et al. ....................... 455/566 |
| 2010/0145924 | A1* | 6/2010 | Zabramski et al. ........... 707/709 |
| 2010/0184405 | A1* | 7/2010 | Chen et al. ..................... 455/410 |
| 2010/0203905 | A1* | 8/2010 | Chaubey et al. ............... 455/458 |

FOREIGN PATENT DOCUMENTS

| EP | 2 157 772 A1 | 2/2010 |
| WO | WO 2008119954 A2 * | 10/2008 |

OTHER PUBLICATIONS

Korva et al., "On-line service adaptation for mobile and fixed terminal devices," University of Oulu, 2001, pp. 1-11.
Poz et al., "Towards Fully Reconfigurable Multimedia Platforms," Ibero-American Symposium in Computer Graphics, 2002, pp. 1-8.
International Search Report for PCT/FI2012/050268 dated Aug. 23, 2012, pp. 1-6.
Written Opinion for PCT/FI2012/050268 dated Aug. 23, 2012, pp. 1-8.

* cited by examiner

*Primary Examiner* — Dang Ton
*Assistant Examiner* — Pamit Kaur
(74) *Attorney, Agent, or Firm* — Ditthavong & Steiner, P.C.

(57) ABSTRACT

An approach is provided for providing a low-power browsing experience on a mobile device. A proxy platform receives a request for a webpage. The proxy platform also receives information about the mobile device. The proxy platform processes and/or facilitates a processing of the information about the mobile device and sends the webpage to the mobile device in a format that is based on the information about the mobile device. The mobile device may then operate in a low-power mode when browsing the requested website.

22 Claims, 10 Drawing Sheets

FIG. 6

| STACK LEVEL | SCREEN | USED BITS |
|---|---|---|
| HIGHEST | SCREEN_8 | R:7, G:7, B:7 |
| . | SCREEN_7 | R:6, G:6, B:6 |
| . | SCREEN_6 | R:5, G:5, B:5 |
| . | SCREEN_5 | R:4, G:4, B:4 |
| . | SCREEN_4 | R:3, G:3, B:3 |
| . | SCREEN_3 | R:2, G:2, B:2 |
| . | SCREEN_2 | R:1, G:1, B:1 |
| LOWEST | SCREEN_1 | R:0, G:0, B:0 |

600

615, 613, 611, 609, 607, 605, 603, 601

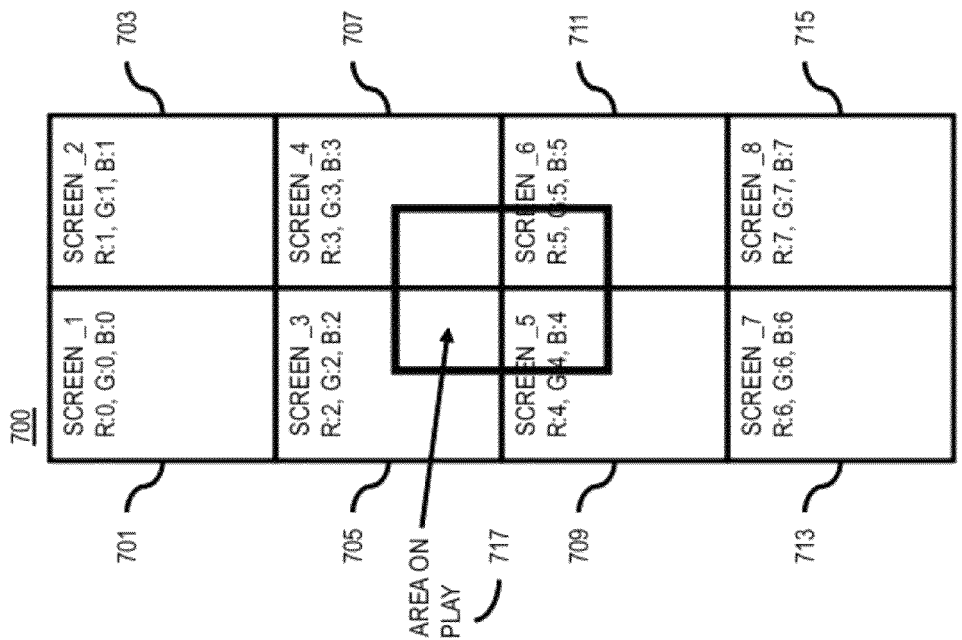
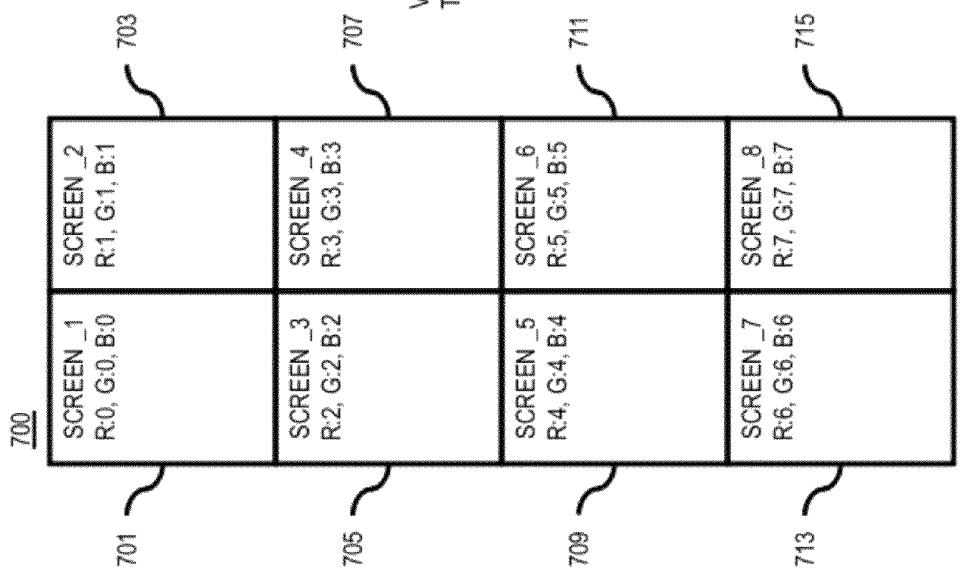

METHOD AND APPARATUS FOR LOW-POWER BROWSING

BACKGROUND

Wireless (e.g., cellular) service providers and device manufacturers are continually challenged to deliver value and convenience to consumers by, for example, providing compelling network services, applications, and content. In light of an increasingly web-centric culture, one emerging service is the use of wireless devices to access web services. However, limited resources within the wireless environment (e.g., bandwidth, processing power) and/or battery power can limit access to such web services on mobile devices. Accordingly, service providers and device manufacturers face significant technical challenges to overcome such limitations by enabling efficient and secure access to web services via, for example, a proxy server.

SOME EXEMPLARY EMBODIMENTS

Therefore, there is a need for an approach for providing a browsing experience to reduce power consumption by a mobile device and increase performance despite limited bandwidth or processing power.

According to one embodiment, a method comprises determining a request, from a device, for service content. The method further comprises determining that the device supports a low-power user interface. The method also comprises causing, at least in part, a processing of the service content for conversion to a format for presentation in the low-power user interface.

According to another embodiment, an apparatus comprises at least one processor, and at least one memory including computer program code, the at least one memory and the computer program code configured to, with the at least one processor, cause, at least in part, the apparatus to determine to request, from a device, service content. The apparatus is further caused to determine that the device supports a low-power user interface. The apparatus is also caused to cause, at least in part, a processing of the service content for conversion to a format for presentation in the low-power user interface.

According to another embodiment, a computer-readable storage medium carries one or more sequences of one or more instructions which, when executed by one or more processors, cause, at least in part, an apparatus to determine to request, from a device, service content. The apparatus is further caused to determine that the device supports a low-power user interface. The apparatus is also caused to cause, at least in part, a processing of the service content for conversion to a format for presentation in the low-power user interface.

According to another embodiment, an apparatus comprises means for determining a request, from a device, for service content. The apparatus further comprises means for determining that the device supports a low-power user interface. The apparatus also comprises means for causing, at least in part, a processing of the service content for conversion to a format for presentation in the low-power user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is chart illustrating a series of divided subparts of a webpage, according to one embodiment;

FIGS. 7A and 7B are diagrams of divided subparts of a webpage with a viewing window illustrating the portion displayed on a UE, according to one embodiment;

DESCRIPTION OF PREFERRED EMBODIMENT

A method and apparatus for providing a low-power browsing experience are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to providing a low-power browsing experience within a wireless network environment, it is contemplated that the various embodiments of the approach described herein may be used within any type of communication system or network and with any mode of communication available of the network (e.g., data communications, Internet communication, voice communication, text communication, etc). In addition, although the various embodiments are further described with respect to mobile devices, it is contemplated that the various embodiments are applicable to any type of device with network access (e.g., stationary terminals, personal computers, etc.).

Figure 1:
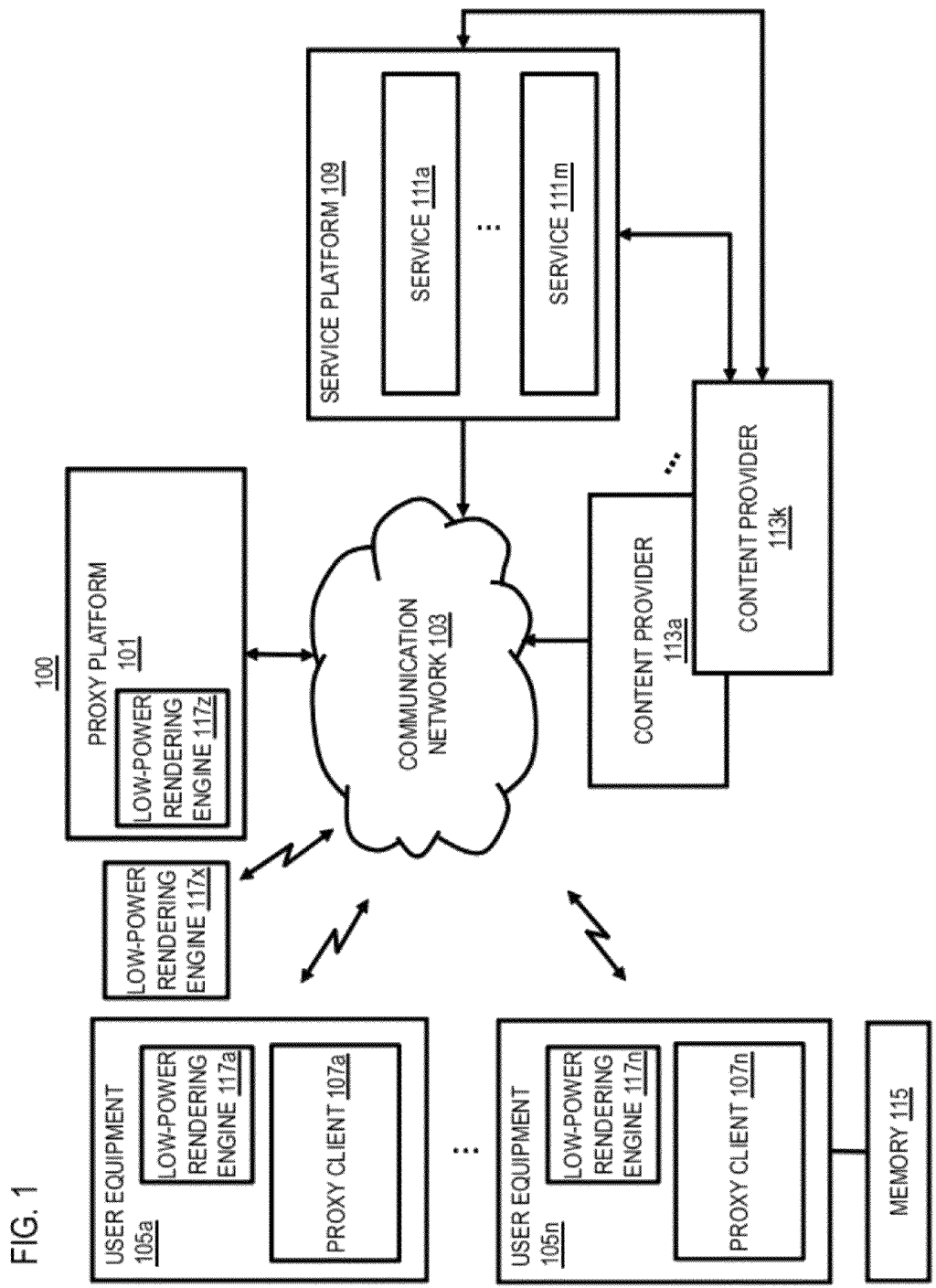
FIG. 1 is a diagram of a communication system capable of providing a low-power browsing experience, according to one embodiment.

FIG. 1 is a diagram of a communication system capable of providing a low-power browsing experience, according to one embodiment. As discussed previously, implementing mobile web services within a wireless environment can potentially tax the relatively limited resources (e.g., bandwidth, processing power, memory, battery power, etc.) that are available within the environment (e.g., within a mobile device). For example, the Internet is getting more widespread every day. Most of the people in western and developed countries have access to the Internet either from home, work or from their mobile devices. In developing countries, the situation can be quite different. Most of the people in developing countries don't have computers, and even fewer have internet access (any kind) Bridging this gap and enabling internet access for next billion users is a significant challenge.

The most important device requirements for these areas of the world are affordability, robustness and long battery life. Introducing internet enabled features into mobile handsets in developed markets has reduced practical battery life from 4-5 days to 1-2 days. This is a particular issue in areas with limited access to electricity. The primary causes of power consumption in internet enabled mobile devices are mobile device display usage and network connectivity. Accordingly, a solution for reducing power consumption by an internet enabled mobile device is needed.

Mobile device displays generally have two states, an active state and an idle state. In the active state, a display renders a normal device User Interface (UI). In the idle state, the display is typically off or on in a state such as an "always-on" display, which may or may not be at a reduced brightness. An always-on display may also refer to a display state between the above-mentioned active and idle states. When a display is in an always-on state, the display is able to show a limited view of UI elements. The limited view is not same view that is available in the active state. The limited view may allow a user to view the display, but the user may not have full functionality of the features displayed, or the user may have limited functionality of the features displayed. Further limitations may include, for example, the number of pixels that can be shown, number of colors and/or the refresh rate of the display. Such an always-on display is beneficial because the power consumption by the mobile device is lower than when the device is in an active state because some features of the mobile device are turned off.

Proxy browsing is a technology that reduces the amount of data that needs to be transferred between a web server and a web browser. An intermediate proxy server located between a mobile device and the Internet may, for example, be used to reduce image sizes, simplify the HTML markup of a webpage, and compress transmitted data. Proxy browsing also allows for a reduction in hardware requirements for internet enabled mobile devices, faster rendering of webpages, and reduced bandwidth usage.

To address the above-mentioned problems, and incorporate the power saving benefits of an always-on display and proxy browsing, a system 100 of FIG. 1 introduces a capability to create a low-power browsing experience via, for example, a proxy platform 101 (e.g., a proxy server) over a communication network 103. In one embodiment, the system 100 enables users (e.g., via user equipment (UEs) 105a-105n (also collectively referred to as UEs 105) to be able to receive internet content by way of the proxy platform 101.

As shown in FIG. 1, the system 100 includes a proxy browsing architecture which consists of one or more proxy clients 107a-107n (also collectively referred to as proxy clients 107) operating within respective client devices (e.g., UEs 105a-105n). In one embodiment, the proxy clients 107 route at least a portion of the communication traffic from the UEs 105 through the proxy platform 101. In some embodiments, the proxy clients 107 may be a browser application. In addition or alternatively, the proxy clients 107 can be independent processes executing in the UEs 105, or can be incorporated in other applications executing in the UEs 105.

In one embodiment, the proxy platform 101 receives requests from the proxy clients 107 to route communication traffic to the intended communication endpoints. In addition, the proxy platform 101 can route return communication traffic from the communication endpoints to the any of the proxy clients 107 and/or UEs 105. By way of example, the communication endpoints can include a service platform 109, the services 111a-111m (also collectively referred to as services 111), the content providers 113a-113k (also collectively referred to as content providers 113), or any other component with connectivity to the communication network 103 (e.g., another UE 105). For example, the service platform 109, the service 111, and/or the content providers 113 may provide any number of services (e.g., mapping services, social networking services, media services, content services, etc.) via a web server or other means of communications (e.g., text messaging, voice, instant messaging, chat, etc.). In other words, the communication endpoints represent a terminating point of communications from the proxy clients 107, and an originating point of communications to the proxy clients 107.

In some embodiments, the proxy platform 101 receives requests from the proxy clients 107 to view a service content, such as a webpage, and the proxy platform 101 can perform any number of communications related functions for routing and/or processing communication traffic. For example, the proxy platform 101 may compress or otherwise modify content that is to be delivered to the proxy clients 107 based, at least in part, on one or more capabilities or characteristics of the receiving UE 105. For example, in wireless environments, the proxy platform 101 can compress data for more efficient transmission, transform content to reduce the amount of data for transfer, reformat content for display in smaller screens, change the content to an image file, etc. The proxy platform 101 may divide the service content into a series of subparts that may be equally or unequally parsed and sent to the UE 105 like a deck of cards based on any of the display capabilities or resolution of a display, available memory, a battery condition, and/or available power mode settings of the UE 105. The proxy platform 101 may also query available information about the UE 105 to determine if the UE 105 supports always-on browsing, for example.

In one embodiment, the proxy platform 101 delivers all the subparts to the UE 105 and/or the proxy client 107. The service content is divided into multiple equal or unequal subparts that may or may not be image files so that a single subpart may be displayed on a single viewable display of the UE 105. This eliminates the need to scroll around an image that is displayed, thereby saving power. The divided service content is saved to a memory 115 that may or may not be part of the UE 105. The memory 115 may be incorporated in the UE 105, or may be attached by a wired connection or wirelessly as an external memory.

When all of the service content data (e.g. all of the subparts) is received by the UE 105 and/or the proxy client 107, the UE 105 switches from a first power setting to a second power setting. The first power setting, for example, may be an active state. The second power setting, for example, may be a state that consumes less power than the active state. The second setting may be an always-on state that reduces the resolution of the display to a level that is lower than the active state. The second setting may also be an always-on state that changes the display to a wireframe mode, a black and white mode, and/or a brightness that is lower than a brightness of the active state. The second setting may also, or alternatively, turn off a network connectivity of the UE 105 to reduce power consumption.

The first subpart of the divided subparts that is displayed on the UE 105 may be displayed in the second setting, and a user may switch between each of the available subparts to view various parts of the service content without having to scroll and use more power. The UE 105 may, however, be switchable back to the first setting to enable a better view of the service content. Viewing the set of subparts may be done in the second setting by requesting the service content from the memory 115 without having to request further data from the proxy platform 101 to reduce power consumption and bandwidth usage. While not incorporating the proxy platform 101 into the mix will generally result in a faster browsing experience, there may be instances where the UE 105 may optimally switch between the first and second settings to speed up or enhance the browsing experience, or if the memory 115 is full, for example. The UE 105 may also use the divided webpage areas as screen shots for a background or a screen saver.

In certain embodiments, a low-power rendering engine 117*a-z* may be resident in any of the UE 105*a*-105*n*, the proxy platform 101, or the low-power rendering engine 117 may be a stand-alone component of the system 100. The low-power rendering engine 117 may control the display of service content on the UE 105 in the second setting, for example. The low-power rendering engine 117 may also control the switching between the first power setting and the second power setting, as discussed above. The low-power rendering engine 117 may cooperate with the proxy client 107 to control communications with the proxy platform 101, but may also control direct communications with service platform 109 and/or content provider 113. A content provider or service provider, for example, may have the capability to communicate directly with the UE 105 without having to parse the service content by way of a proxy platform. The low-power rendering engine 117, in this instance, would have the ability to cause a low-power browsing experience on its own by acquiring service content and converting the service content to a format that the UE 105 can handle in a low-power mode. The low-power rendering engine 117 may also control navigation through the various subparts that are divided and stored on the memory 115.

By way of example, the UE 105 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 105 can support any type of interface to the user (such as "wearable" circuitry, etc.).

Additionally, the communication network 103 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

Communication is facilitated between the UE 105 and the proxy platform 101 via the communication network 103 using well known, new or still developing protocols. In this context, a protocol includes a set of rules defining how the network nodes within the communication network 103 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the proxy clients 107 and the proxy platform 101 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
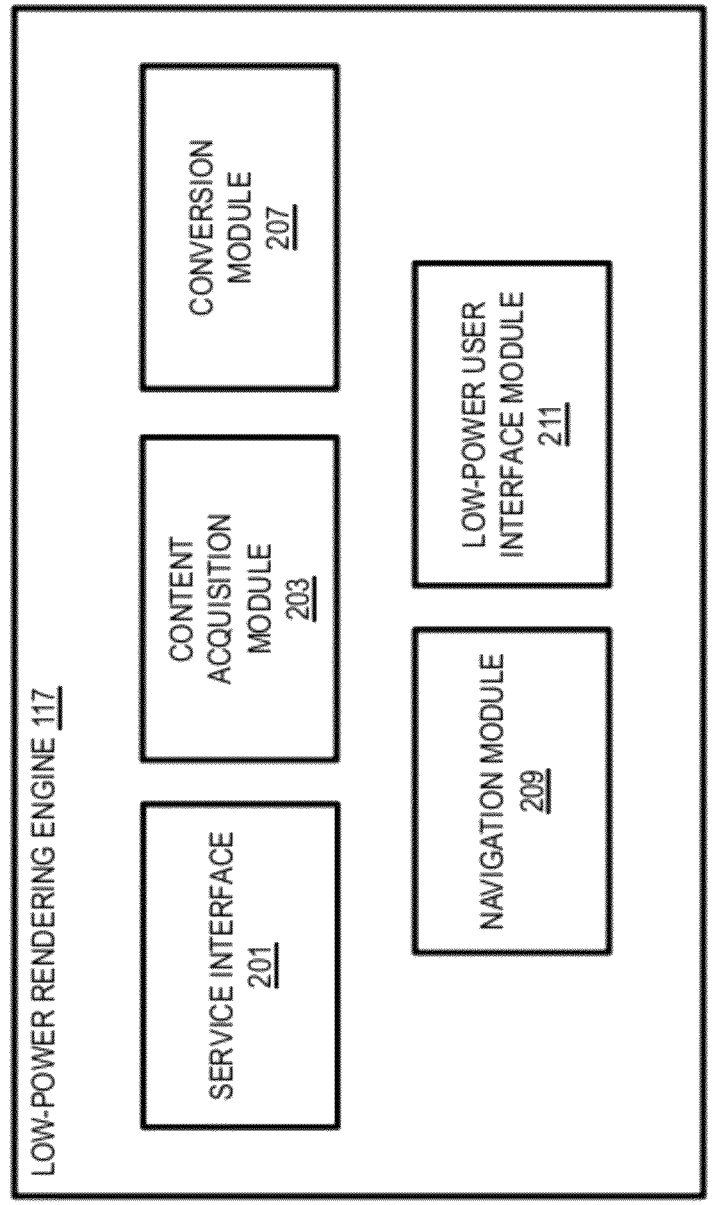
FIG. 2 is a diagram illustrating a rendering engine and its components, according to one embodiment.

FIG. 2 is a diagram illustrating the low-power rendering engine 117, according to one embodiment. The low-power rendering engine 117 comprises a service interface 201, a content acquisition module 203, a conversion module 207, a navigation module 209 and a low-power user interface module 211. As discussed above, the low-power rendering engine 117 may be resident in any of the UE 105, the proxy platform 101, or it may be a stand-alone component of system 100 that communicates to any of the other components by way of the communication network 103. The low-power rendering engine may control the sending and receipt of service content and information about the UE 105. The low-power rendering engine 117 communication with the other components of system 100, by way of the service interface 201. The service interface 201 may be used to send and receive service content from the service platform 109 or the content provider 113. The content acquisition module 203 is a component of the rendering engine 117 that may temporarily save acquired service content so that it may be converted to a viewable format by the conversion module 207. The conversion module 207 may convert the service content to a format that the UE 105 can handle, such as dividing the service content into multiple subparts, converting the service content to image files, and/or shrinking the size of the service content to a file size that is manageable by the UE 105.

When the UE 105 receives the service content by way of the conversion module, the low-power user interface module 211 may actuate a low-power mode on the UE 105 based on the UE 105's capabilities. The low-power user interface module 211 may enable a wireframe mode, a limited functionality mode, a mode that enables only the display, and the like. A user may navigate through the service content by way of a user interface. The navigation may be controlled by the navigation module 209. The navigation module 209 may be actuated by way of a switch, a touch screen, a button, voice commands, or other sensory direction to change what portion of the service content is displayed.

Figure 3:
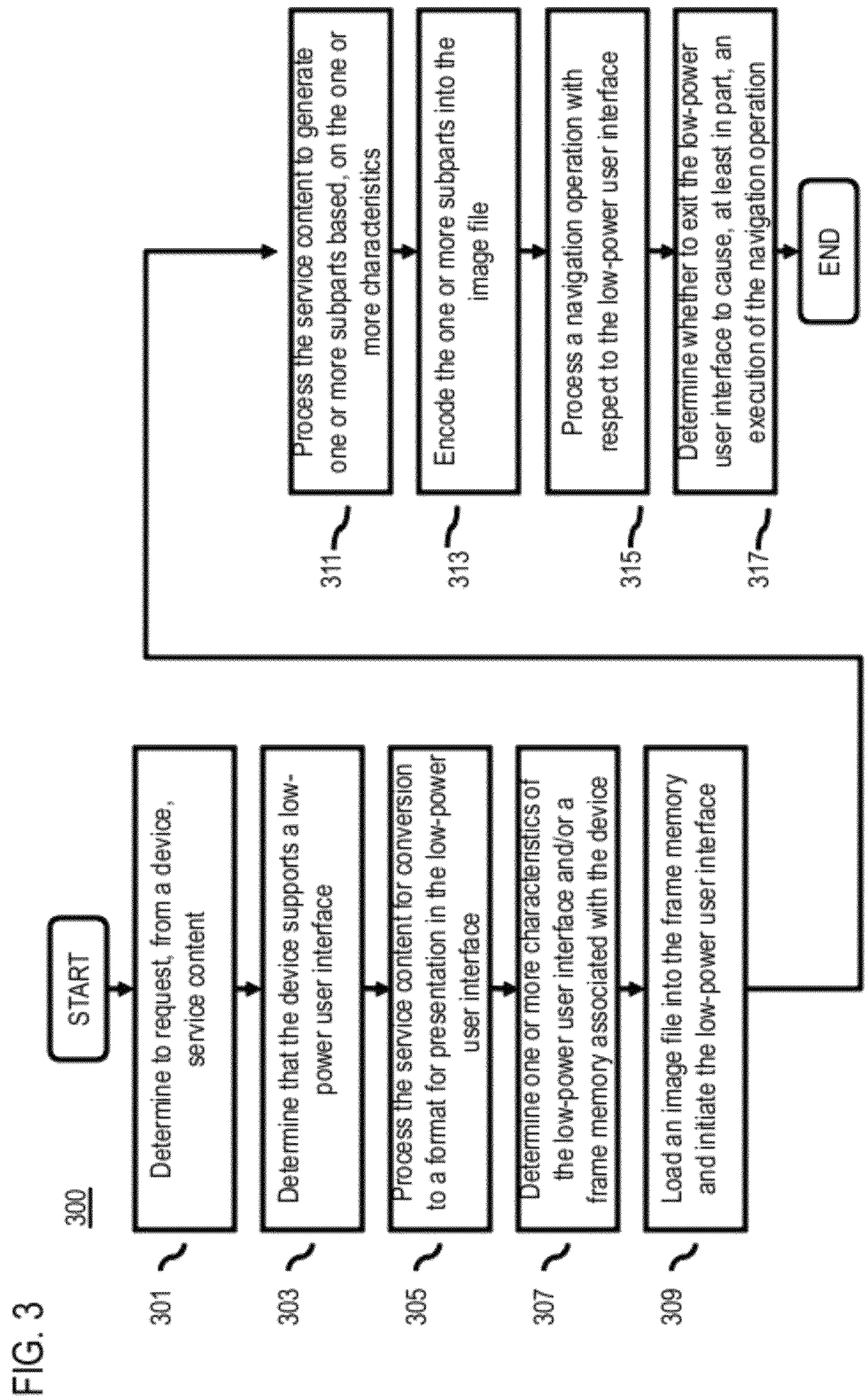
FIG. 3 is a flowchart of a process for providing a low-power browsing experience, according to one embodiment.

FIG. 3 is a flowchart of a process for providing a low-power browsing experience, according to one embodiment. In one embodiment, the low-power rendering engine 117 performs the process 300 and is implemented in, for instance, a chip set including a processor 903 and a memory 905 as shown FIG. 9. The process 300 begins at step 301 in which the low-power rendering engine 117 determines to request, from a device, service content. The process continues to step 303 in which the low-power rendering engine 117 determines whether the UE 105 supports a low-power user interface. Next, the process continues to step 305 in which the low-power rendering engine 117 processes the requested service content for conversion to a format for presentation in the low-power user interface. In step 307, the low-power rendering engine 117 determines one or more characteristics of the low-power user interface and/or the memory 115 associated with the UE 105. When the characteristics of the UE 105 and memory 115 are determined, an image file of the service content is loaded into the memory 115 and the low-power user interface is initiated (step 309). The process optionally continues to step 311 in which the service content is processed to generate one or more subparts based on the one or more characteristics of the UE 105 and the memory 115. The process then continues to step 313 in which the one or more subparts are encoded into one or more image files. Next, the process optionally continues to step 315 to process a navigation operation that is detected and controlled by the navigation module 209. The low-power rendering engine 117 then determines, in step 317, whether to keep the UE 105 in the low-power mode or to exit the low-power mode to cause the navigation operation, or any other operation that may be actuated.

Figure 4:
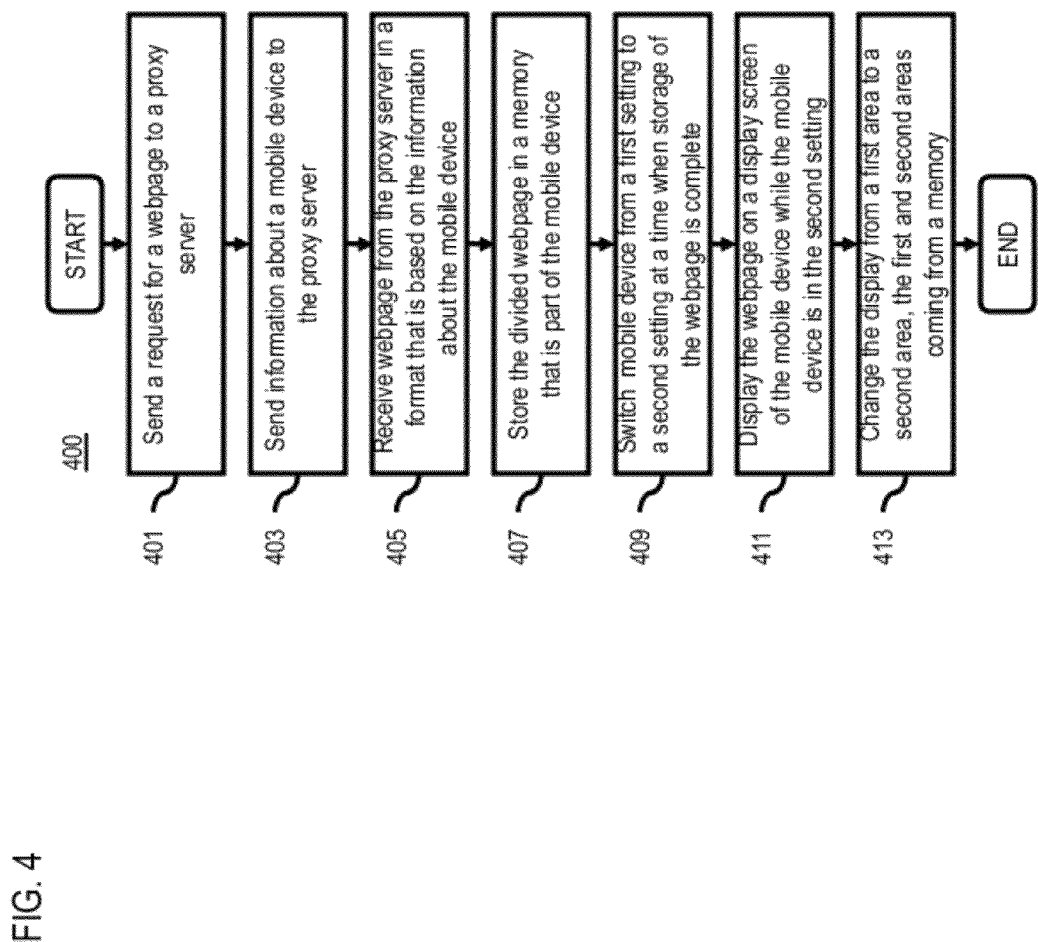
FIG. 4 is a flowchart of a process for providing a low-power browsing experience, according to one embodiment.

FIG. 4 is a flowchart of a process for providing a low-power browsing experience, according to one embodiment. In one embodiment, the proxy platform 101 performs the process 400 and is implemented in, for instance, a chip set including a processor 903 and a memory 905 as shown FIG. 9. In step 401, the proxy platform 101 receives a request for a webpage from the proxy client 107. Next, proxy client sends information about the UE 105 to the proxy platform 101 (step 403). The process continues to step 405 in which the proxy platform 101 sends the webpage to the proxy client 107 in a format that is based on the information about the UE 105.

In one embodiment, the webpage is stored in memory 115 (step 407). In another embodiment, the proxy platform 101 may divide the webpage into equal or unequal subparts and send the subparts as a bundle or individually to the proxy client 107 for storage in the memory 115.

The process continues to step 409 in which the UE 105 is caused to switch between a first power setting and a second power setting when the storage of the webpage in the memory 115 is complete. Next, in step 411, the webpage, divided or undivided, is displayed on the UE 105 in the second power setting to reduce power consumption. Next, in step 413, the user may navigate the webpage by requesting additional subparts from the memory 115 so that the proxy platform 101 need not be activated, and bandwidth and power consumption may be reduced.

Figure 5:
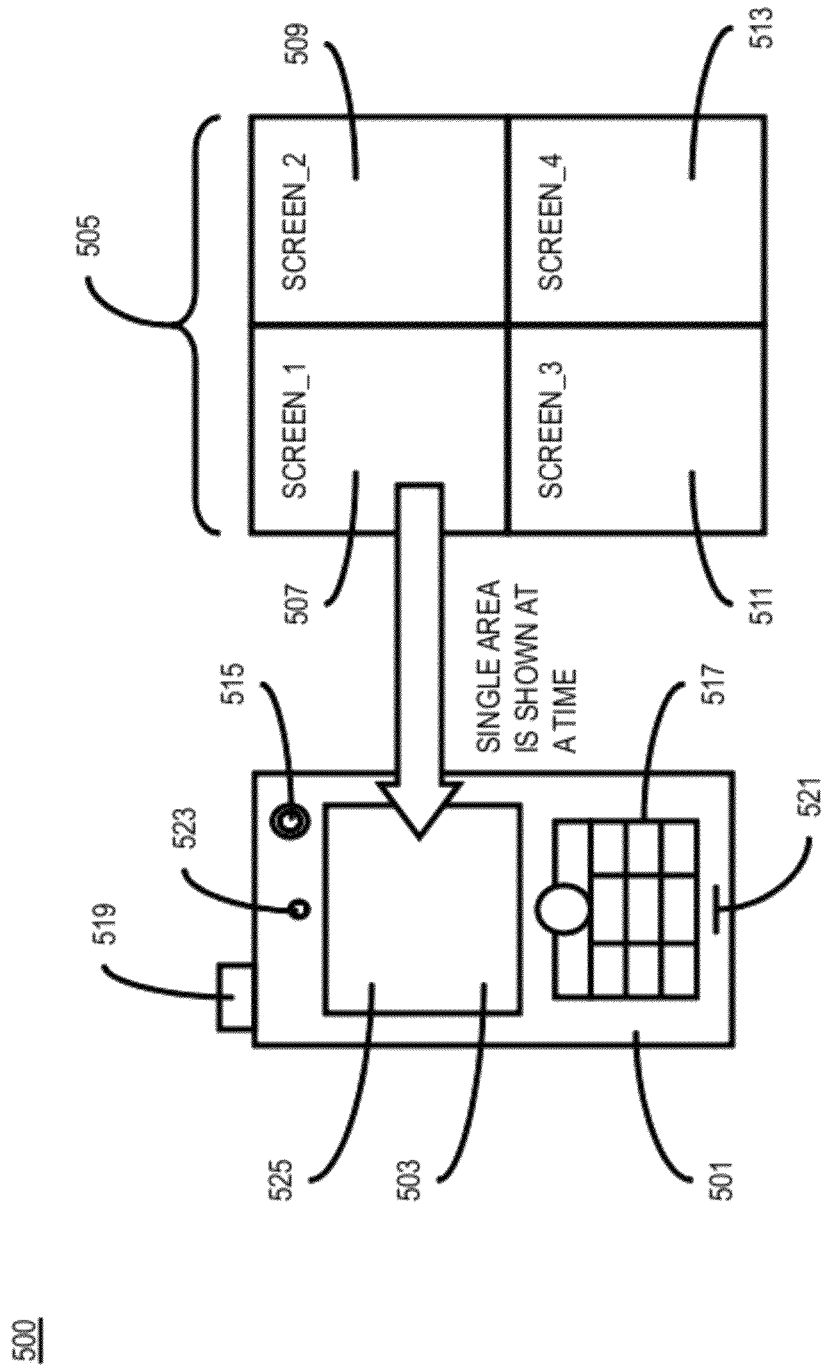
FIG. 5 is a diagram illustrating a User Equipment (UE) having a screen, according to one embodiment.

FIG. 5 is a diagram, according to one embodiment, illustrating a UE 501 having a screen 503. A webpage 505 is also shown, and is divided into four subparts 507-513. The webpage 505 is divided by the proxy platform 101 and stored in the memory 115, as discussed above. Only a single screen shot 507, 509, 511 or 513 is shown on the screen 503 at a time. A user may, however, be able to view a combination shot that is the size of the display of all of the divided screen shots as the user navigates between subparts.

As discussed above, the UE 501 may include any of, for example a camera 515, a keyboard 517, a radio 519, a microphone 521, a speaker 523, a display 503, and/or a touch screen 525, among other components. A processor 903, as discussed below in FIG. 9 controls the webpage division and navigation. The radio component 519 is a component which converts electrical information from/to radio waves.

FIG. 6 is an illustration of a chart 600 that shows an example of a stacking of divided webpage subparts 601-615, according to one embodiment. The radio component 519 discussed above in FIG. 5 receives a webpage from the proxy platform 101 which is, for example, 8×240×320×24 bit/pixel, 24 bit/pixel=R:8 bit, G:8 bit, B:8 bit. The proxy platform 101, in this example, divides the webpage into eight subparts of the webpage using 3 bit/pixel (R:1 bit, G:1 bit, B:1 bit). Each subpart of the webpage is using its own bit level. For example, Screen_1 601 is using bits R:0, G:0, B:0, Screen_2 is using bits R:1, G:1, B:1, ..., Screen_8 is using bits R:7, G:7, B:7 (i.e. each subpart of the webpage is stacked on its own layers). The example discussed above is merely an example of a manner that the proxy platform 101 may divide a webpage into multiple subparts. The proxy platform 101 may divide a webpage into any number of subparts of equal or different sizes. The sizes of the subparts may be the same as the display size of the UE 105, or the sizes of the subparts may be larger or smaller. The proxy platform 101 may also not divide the webpage into multiple areas, but instead the proxy platform 101 may shrink the webpage, or zoom in on a particular area of interest on the webpage while sending the webpage to the proxy client 107.

The low-power rendering engine 117 discussed above in FIG. 1 converts electrical information to a readable format. In one embodiment, the low-power rendering engine 117 receives eight stacked divided subparts of a webpage from the proxy platform 101 (e.g., 3 bit (=8 colors)×8 divided subparts×(240×320)), which are stored on the memory 115.

FIGS. 7A and 7B are diagrams of example divided webpage subparts, according to one embodiment. FIG. 7A shows an example layout 700 of eight subparts of a webpage 701-715 in a lower power mode (idle mode) in a display. The low-power rendering engine 117 determines what informing wanted bit level (0, 1, 2, ..., 7) is needed, what is a same as bit level as a desired divided subpart of a webpage, for display panel refreshing from the memory 115. For example, if the bit level is 5, bits R:5, G:5, B:5 are read from the memory 115 to refresh an image on the display (Screen_6 711 in this case). All components of UE 105 at this point enter a low-power mode except any component of the UE 105 that are needed to refresh a display image such as, for example, input devices, switches, a part of the touch screen or part of physical keyboard, that can receive the user's inputs, or are connected to the low-power rendering engine 117.

When in the low-power mode a user may actuate a switch to switch between subparts of the webpage, in a left direction, for example when the low-power rendering engine 117 is using bit level 4 for display refreshing when the user can see Screen_5 709. A similar method may be used for switching in another direction with other switches, for example. The switching may be controlled by the navigation module 209, discussed above.

To leave the lower power mode, according to one embodiment, the user may select by actuating a switch for example, a function that makes the mobile device leave the low-power mode. In this case, the low-power rendering engine 117 reads from the display what used bit level is needed (=used subpart) for refreshing the display. The low-power rendering engine 117 uses this used bit level information to select the correct subpart (24 bit/pixel×240×320) on the UE 105 and the memory 115 to determine what content is sent to be displayed. In this embodiment, the low-power rendering engine 117 sends a command that changes the display from a low-power mode to a full color mode (i.e., 24 bit/pixel, high power mode).

In certain embodiments, in the low-power mode, movements are not based on that only one of the divided subparts 701-715 that is refreshed on display, but also parts of the other subparts that can also be visible on the display. In other words, a view is pixel based rather than based on only one subpart, and the user may pan through subparts seamlessly.

FIG. 7B shows an example of the UE 105 reading memory 115 and refreshing its display, according to one embodiment. The display refreshing of subparts 701-715 from a starting point in a first screen to midway in a second screen, illustrated, for example, by a visible frame 717. In this example, the bit level is 2 (Screen_3 705) for left part of the display and bit level is 3 (Screen_4 707) for right part of the visible frame 717. Display refreshing from the midway point to the end is at a bit level of 4 (Screen_5 709) for the left part of the display and a bit level of 5 (Screen_6 711) for the right part of the visible frame 717. This same method can be used if the user wants to move a particular pixel in any direction. Optionally, the number of colors available on the display may change when the number of divided subparts also changes. Further optionally, it is also possible that Screen_1-Screen_8 701-715, as discussed above, are used as a screen saver when each bit level includes screen saver content. In this example the low-power rendering engine 117 may select a subpart, and based on what is refreshed on the display, the UE 105 can select a new screen saver image.

The processes described herein for providing a low-power browsing experience may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
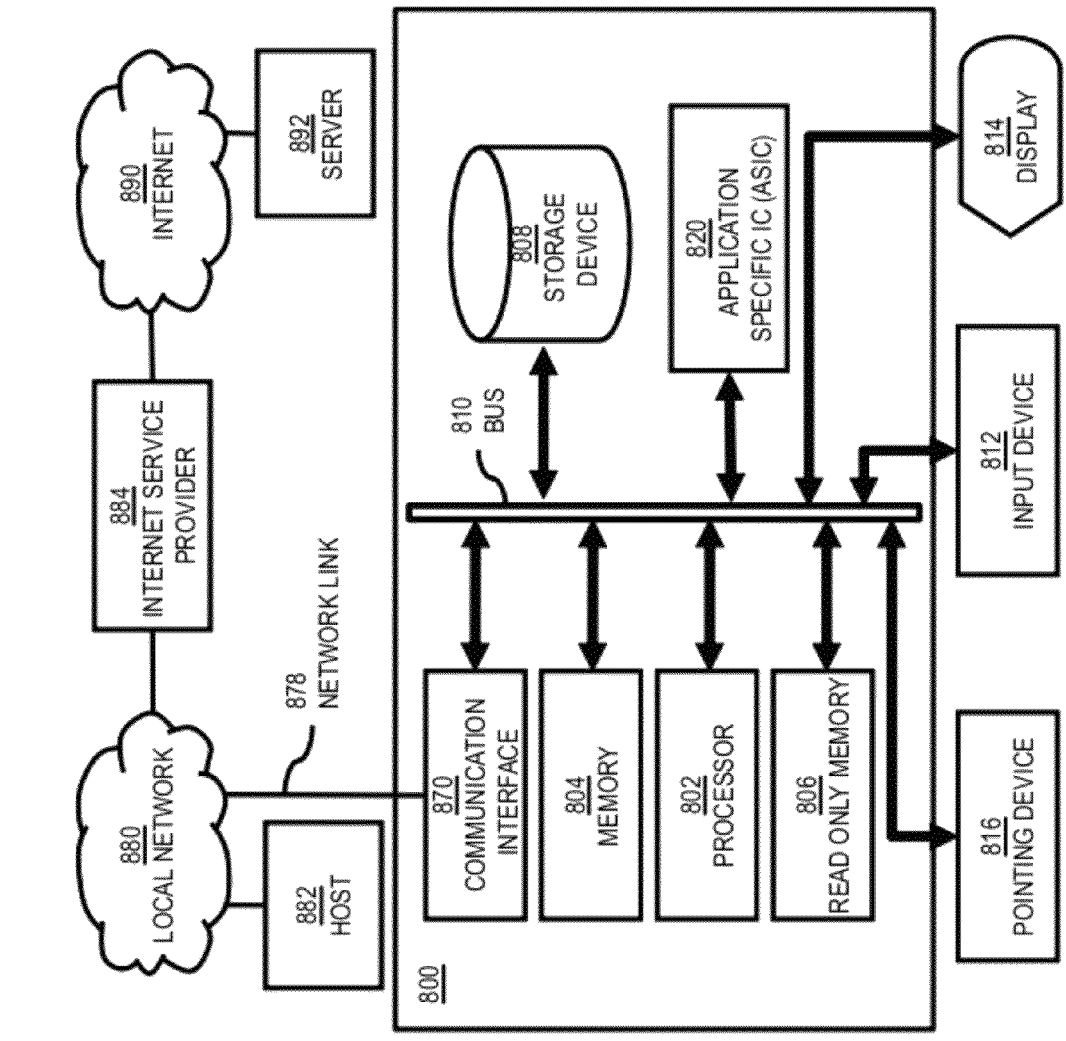
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide a low-power browsing experience as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing a low-power browsing experience.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing a low-power browsing experience. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing a low-power browsing experience. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a low-power browsing experience, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 103 for providing a low-power browsing experience to the UE 105.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
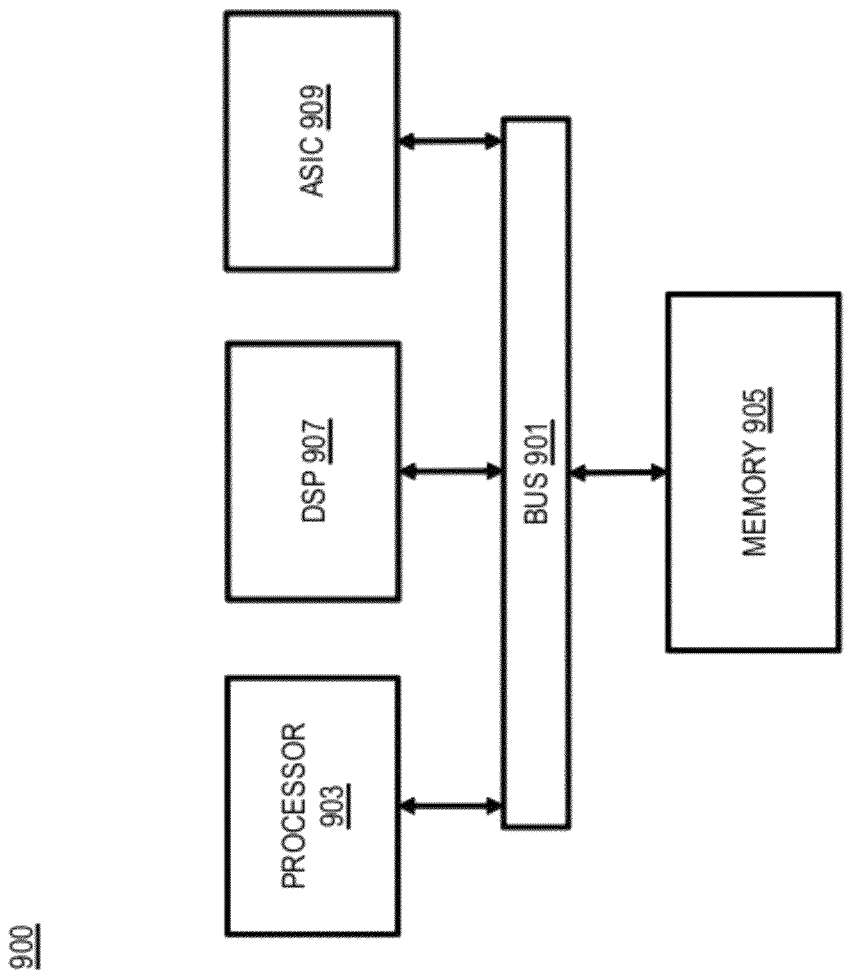
FIG. 9 is a diagram of a chip set that can be used to implement an embodiment of the invention.

FIG. 9 illustrates a chip set or chip 900 upon which an embodiment of the invention may be implemented. Chip set 900 is programmed to provide a low-power browsing experience as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing a low-power browsing experience.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a low-power browsing experience. The memory 905 also stores the data associated with or generated by the execution of the inventive steps.

Figure 10:
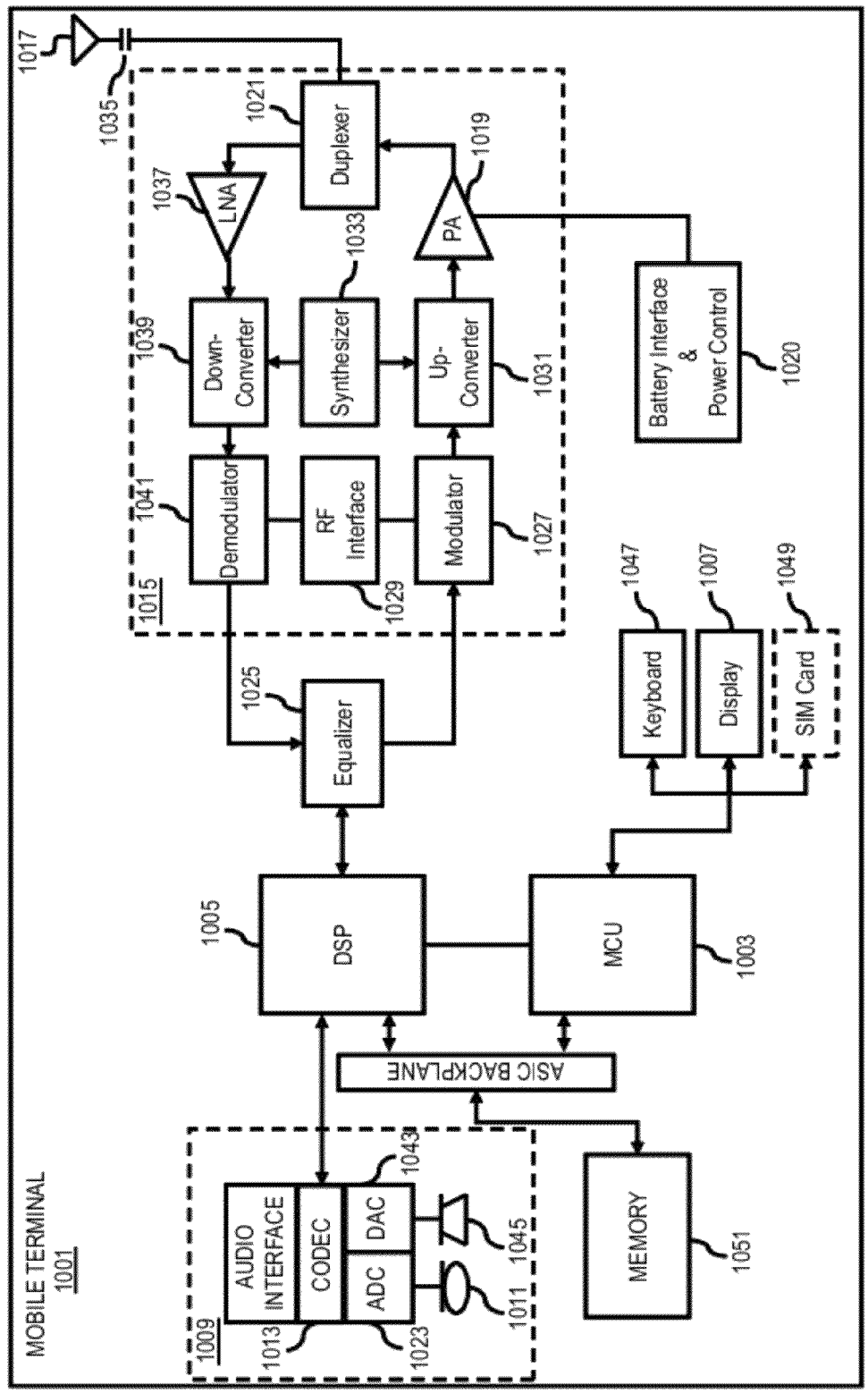
FIG. 10 is a diagram of a mobile station (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing a low-power browsing experience. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a low-power browsing experience. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The MCU 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission through the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a low-power browsing experience. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a request, from a device, for service content;
   at least one determination that the device supports a low-power user interface based, at least in part, on information in the request; and
   a processing of one or more bit levels of the service content for conversion to a format for presentation in the low-power user interface,
   wherein the one or more bit levels determine, at least in part, respective color depths of the service content.

2. A method of claim 1, wherein the (1) data and/or (2) information and/or (3) at least one signal are further based, at least in part, on the following:
   one or more characteristics of the low-power user interface, a memory associated with the device, or a combination thereof,
   wherein the conversion of the service content to the format is based, at least in part, on the one or more characteristics.

3. A method of claim 2, wherein the one or more characteristics include, at least in part, a display resolution, a number of color bits per pixel, a size of the memory, a wireframe mode, a black and white mode, display brightness, a network connectivity status, a power status, or a combination thereof.

4. A method of claim 2, wherein the format is an image file, the method further comprising:
   a loading of the image file into a memory associated with the low-power user interface to initiate the low-power user interface.

5. A method of claim 4, wherein the (1) data and/or (2) information and/or (3) at least one signal are further based, at least in part, on the following:
   a processing of the service content to generate one or more subparts of the content based, at least in part, on the one or more characteristics; and
   an encoding of the one or more subparts into the image file.

6. A method of claim 5, wherein the one or more subparts correspond to and are encoded at respective one or more bit levels of the image file, wherein the one or more bit levels determine, at least in part, respective color depths of the one or more subparts.

7. A method of claim 1, wherein the (1) data and/or (2) information and/or (3) at least one signal are further based, at least in part, on the following:
   a processing of a navigation operation with respect to the low-power user interface; and
   at least one determination of whether to exit the low-power user interface to cause, at least in part, an execution of the navigation operation.

8. A method of claim 1, wherein the navigation operation comprises at least one of changing a display area of the low-power user interface from a first area of the service content to a second area of the service content, or changing the presentation from the service content to other service content.

9. A method of claim 1, wherein the service content includes, at least in part, web content.

10. A method of claim 1, wherein the service content is provided via a proxy server.

11. An apparatus of claim 1, wherein the service content is provided via a proxy server.

12. A method of claim 1, further comprising:
dividing the service content into plural subparts of equal size; and
refreshing a display of the low-power user interface based, at least in part, on at least one of the plural subparts at different time intervals,
wherein the plural subparts correspond to one or more non-overlapping subsets of the one or more bit levels.

13. An apparatus comprising:
at least one processor; and
at least one memory including computer program code for one or more programs,
the at least one memory and the computer program code configured to, with the at least one processor, cause the apparatus to perform at least the following,
determine to request, from a device, service content;
determine that the device supports a low-power user interface based, at least in part, on information in the request; and
cause, at least in part, a processing of one or more bit levels of the service content for conversion to a format for presentation in the low-power user interface,
wherein the one or more bit levels determine, at least in part, respective color depths of the service content.

14. An apparatus of claim 13, wherein the apparatus is further caused to:
determine one or more characteristics of the low-power user interface, a memory associated with the device, or a combination thereof,
wherein the conversion of the service content to the format is based, at least in part, on the one or more characteristics.

15. An apparatus of claim 14, wherein the one or more characteristics include, at least in part, a display resolution, a number of color bits per pixel, a size of the memory, a wireframe mode, a black and white mode, display brightness, a network connectivity status, a power status, or a combination thereof.

16. An apparatus of claim 14, wherein the format is an image file, and the apparatus is further caused to:
cause, at least in part, loading of the image file into a memory associated with the low-power user interface to initiate the low-power user interface.

17. An apparatus of claim 16, wherein the apparatus is further caused to:
process and/or facilitate a processing of the service content to generate one or more subparts of the content based, at least in part, on the one or more characteristics; and
cause, at least in part, encoding of the one or more subparts into the image file.

18. An apparatus of claim 17, wherein the one or more subparts correspond to and are encoded at respective one or more bit levels of the image file, wherein the one or more bit levels determine, at least in part, respective color depths of the one or more subparts.

19. An apparatus of claim 13, wherein the apparatus is further caused to:
process and/or facilitate a processing of a navigation operation with respect to the low-power user interface; and
determine whether to exit the low-power user interface to cause, at least in part, an execution of the navigation operation.

20. An apparatus of claim 13, wherein the navigation operation comprises at least one of changing a display area of the low-power user interface from a first area of the service content to a second area of the service content, or changing the presentation from the service content to other service content.

21. An apparatus of claim 13, wherein the service content includes, at least in part, web content.

22. An apparatus of claim 13, wherein the apparatus is further caused to:
divide the service content into plural subparts of equal size, and
refresh a display of the low-power user interface based, at least in part, on at least one of the plural subparts at different time intervals,
wherein the plural subparts correspond to one or more non-overlapping subsets of the one or more bit levels.

* * * * *